(12) United States Patent
Maruyama et al.

(10) Patent No.: US 10,072,556 B2
(45) Date of Patent: Sep. 11, 2018

(54) REFRIGERANT CONTROL VALVE APPARATUS

(71) Applicant: AISIN SEIKI KABUSHIKI KAISHA, Kariya-shi, Aichi (JP)

(72) Inventors: Koichi Maruyama, Anjo (JP); Naoto Yumisashi, Nagoya (JP)

(73) Assignee: AISIN SEIKI KABUSHIKI KAISHA, Kariya-Shi, Aichi (JP)

( * ) Notice: Subject to any disclaimer, the term of this patent is extended or adjusted under 35 U.S.C. 154(b) by 0 days.

(21) Appl. No.: 15/527,163

(22) PCT Filed: Sep. 25, 2015

(86) PCT No.: PCT/JP2015/077133
§ 371 (c)(1),
(2) Date: May 16, 2017

(87) PCT Pub. No.: WO2016/092936
PCT Pub. Date: Jun. 16, 2016

(65) Prior Publication Data
US 2017/0335749 A1    Nov. 23, 2017

(30) Foreign Application Priority Data
Dec. 12, 2014 (JP) .................... 2014-251991

(51) Int. Cl.
*F01P 7/16*     (2006.01)
*F16K 31/00*   (2006.01)
(Continued)

(52) U.S. Cl.
CPC ............ *F01P 7/16* (2013.01); *F01P 11/16* (2013.01); *F16K 11/0873* (2013.01);
(Continued)

(58) Field of Classification Search
CPC ............ F01P 2007/146; F01P 2031/00; F01P 2031/32; F01P 2070/02; F01P 7/026;
(Continued)

(56) References Cited

U.S. PATENT DOCUMENTS 5,809,944 A * 9/1998 Aoki .................. B60H 1/00878
123/41.02
6,684,651 B1 * 2/2004 Yoshizawa .......... F16K 11/0655
137/625.43

(Continued)

FOREIGN PATENT DOCUMENTS

| DE | 102011081183 A1 | 2/2013 |
|---|---|---|
| JP | 2012-519800 A | 8/2012 |
| JP | 2013-238155 A | 11/2013 |

OTHER PUBLICATIONS

Extended European Search Report issued by the European Patent Office dated Oct. 27, 2017 in corresponding European Patent Application No. 15867422.6 (6 pages).

*Primary Examiner* — Long T Tran
(74) *Attorney, Agent, or Firm* — Buchanan Ingersoll & Rooney PC

(57) ABSTRACT

A refrigerant control valve apparatus includes a valve body provided with a main control valve controlling the refrigerant sent to a discharge port and a temperature sensing control valve controlling supply and discharge of the refrigerant to a temperature sensing chamber. A fail-safe mechanism is provided which supplies the refrigerant to the discharge port in a case where the temperature of the refrigerant exceeds a set value. The temperature sensing control valve is set in an open posture in a case where the main control valve is in a closed posture that closes the discharge port and the temperature sensing control valve is set in a closed posture in a case where the main control valve is in an open posture that opens the discharge port.

3 Claims, 7 Drawing Sheets

(51) Int. Cl.
 *F01P 11/16* (2006.01)
 *F16K 11/087* (2006.01)
 *F01P 7/14* (2006.01)

(52) U.S. Cl.
 CPC ..... *F01P 2007/146* (2013.01); *F01P 2031/32* (2013.01); *F01P 2031/34* (2013.01)

(58) Field of Classification Search
 CPC ...... F01P 7/12; F16K 31/041; F16K 11/0743; F16K 17/168
 See application file for complete search history.

(56) References Cited

U.S. PATENT DOCUMENTS

| | | | | |
|---|---|---|---|---|
| 7,454,910 | B2* | 11/2008 | Hamada | F01K 23/065 60/618 |
| 2004/0060308 | A1* | 4/2004 | Yoshizawa | F16K 11/0655 62/160 |
| 2010/0212612 | A1* | 8/2010 | Vacca | F01P 7/165 123/41.09 |
| 2012/0055652 | A1 | 3/2012 | Triebe et al. | |
| 2013/0221116 | A1* | 8/2013 | Tsuchiya | F01P 7/14 236/34.5 |
| 2014/0165562 | A1* | 6/2014 | Nagai | F01P 7/165 60/615 |
| 2015/0122359 | A1 | 5/2015 | Tsuchiya et al. | |
| 2015/0258875 | A1* | 9/2015 | Enomoto | B60L 1/003 165/104.31 |

* cited by examiner

REFRIGERANT CONTROL VALVE APPARATUS

TECHNICAL FIELD

The present invention relates to a refrigerant control valve apparatus in which a valve body of a rotary type is accommodated in a valve housing provided with an inlet port to which refrigerant from an internal combustion engine is supplied and a discharge port sending out the refrigerant, wherein the refrigerant inside is forcibly discharged to the discharge port in a case where temperature of the refrigerant increases and exceeds a set value.

BACKGROUND ART

As a refrigerant control valve apparatus configured as described above, Patent document 1 indicates a technique including a main valve which is provided with an opening to which a refrigerant (a coolant water) of a water jacket of an engine is supplied and a main discharge portion, and which controls the refrigerant flowing from the opening into the main discharge portion. According to the technique, a flow path is formed through which the refrigerant is sent from the opening to the main discharge portion via a sub chamber portion and a detour flow path. The technique includes a fail-safe valve provided at a flow path through which the refrigerant flows from the sub chamber portion to the detour flow path.

According to the technique of Patent document 1, even in a state where the main valve is closed, the fail-safe valve opens when temperature of the refrigerant increases, and accordingly the refrigerant from the opening can be discharged to the main discharge portion.

In Patent document 2, a technique is indicated in which a rotational slider formed in a closed-end-cylindrical shape is rotatably accommodated inside a housing. By matching respective flow ports of the housing and of the rotational slider with each other, a refrigerant from an outside of the housing is supplied to an inside of the rotational slider, and then is sent out by a pump to an outside. According to the technique, a thermostat valve is provided at a position adjacent to the flow port of the housing, and a flow path is formed through which the fluid is supplied from the thermostat valve to the pump via a gap between an outer circumference of the housing and an inner circumference of the rotational slider.

According to the technique of Patent document 2, even in a case where a phase is established in which the refrigerant does not flow into the inside of the rotational slider, the refrigerant can be sent out to the pump and be circulated, by opening the thermostat valve as the temperature of the refrigerant increases.

DOCUMENT OF PRIOR ART

Patent Document

Patent document 1: JP2013-238155A
Patent document 2: Japanese Translation of PCT International Application Publication No. JP-T-2012-519800A

OVERVIEW OF INVENTION

Problem to be Solved by Invention

This type of valve apparatus includes a valve body controlling a flow of a refrigerant (a coolant water) and an actuator controlling the valve body on the basis of a detection result of a temperature sensor measuring temperature of the refrigerant. Accordingly, in a case where the temperature of the refrigerant is less than a set value, for example, immediately after start-up of an internal combustion engine, a control is performed under which the circulation of the refrigerant is blocked and warming-up is performed. In a case where the temperature of the refrigerant exceeds the set value, a control is performed under which the refrigerant is circulated via a radiator and a temperature of the refrigerant is controlled.

In addition, this type of valve apparatus includes a fail-safe mechanism. In a case where the valve apparatus is fixed in a state where the circulation of the refrigerant is blocked due to a failure of, for example, the actuator, the fail-safe mechanism opens to allow the refrigerant to flow as the temperature of the refrigerant increases, in order to restrict the internal combustion engine from being overheated. The fail-safe mechanism is shown as the fail-safe valve in Patent document 1 and is shown as the thermostat valve in Patent document 2.

In each of Patent document 1 and Patent document 2, however, the fail-safe mechanism is arranged at a position at which the refrigerant supplied to the valve apparatus is always in contact with the fail-safe mechanism. Consequently, for example, even in a situation where the valve body of the valve apparatus is already open and the refrigerant is supplied to the radiator, the fail-safe mechanism may open in a case where the temperature of the refrigerant further increases. In addition, the fail-safe mechanism may open also in a case where the temperature of the refrigerant that is in contact with the fail-safe mechanism temporarily increases during the warming-up. Thus, there is a room for improvement from a viewpoint of the temperature management of the internal combustion engine.

Therefore, it is desired that a refrigerant control valve apparatus is configured, which appropriately performs a temperature management of an internal combustion engine which uses a refrigerant.

Means for Solving Problem

A characteristic of the present invention is that a refrigerant control valve apparatus includes a valve housing provided with an inlet port to which refrigerant from an internal combustion engine is supplied and a discharge port from which the refrigerant is sent out, a valve body provided at an inside of the valve housing to be rotatable about a rotational axis, the valve body corresponding to a rotary-type, and a fail-safe mechanism configured to send out the refrigerant to the discharge port via a bypass flow path in a case where temperature of the refrigerant from the internal combustion engine exceeds a set value, wherein the valve body is configured to include a main control valve controlling supply and discharge of the refrigerant to the discharge port and a temperature sensing control valve controlling supply and discharge of the refrigerant to a temperature sensing chamber in which the fail-safe mechanism is accommodated, in such a manner that the main control valve and the temperature sensing control valve rotate integrally with each other, the valve body sets the temperature sensing control valve in an open posture in a case where the main control valve is in a closed posture that closes the discharge port, and the valve body sets the temperature sensing control valve in a closed posture in a case where the main control valve is in an open posture that opens the discharge port.

According to this configuration, the temperature sensing control valve is set in the open posture in a case where the main control valve of the valve body is in the closed posture, and thus the refrigerant inside the valve housing can be made to be in direct contact with the fail-safe mechanism and the fail-safe mechanism can be opened as the temperature rises. In addition, in a case where the main control valve is in the open posture, the temperature sensing control valve is set in the closed posture, and thus the refrigerant inside the valve housing is not in direct contact with the fail-safe mechanism. Accordingly, for example, even in a case where the temperature of the refrigerant inside the valve housing increases temporarily, an inconvenience in which the fail-safe mechanism opens is restricted. Further, even in a case where the temperature of the temperature sensing chamber increases temporarily and a state is switched to a state in which the fail-safe mechanism sends out the refrigerant to the discharge port, the refrigerant is not supplied to the temperature sensing chamber, and accordingly an inconvenience in which the refrigerant is excessively sent out from the discharged port does not occur. Consequently, the refrigerant control valve apparatus is configured, which appropriately performs a temperature management of the internal combustion engine which uses the refrigerant.

As another characteristic, the fail-safe mechanism may be configured as a thermostat type including a heat sensing member, the heat sensing member closes the bypass flow path with an on-off valve in a case where the temperature of the refrigerant is less than a set value and opens the bypass flow path with the on-off valve due to thermal expansion in a case where the temperature of the refrigerant exceeds a set value.

According to this, the on-off valve can be opened with the use of the simple phenomenon that the heat sensing member expands in a case where the temperature of the refrigerant exceeds the set value.

As another characteristic, the temperature sensing control valve may open at a position which faces the temperature sensing chamber in a case where the main control valve is in the closed posture.

According to this, in a case where the main control valve is in the closed posture, the refrigerant can be directly supplied from the temperature sensing control valve that is in the open posture, from the position close to the temperature sensing portion. Consequently, the on-off valve can be opened in a form reflecting the temperature increment of the refrigerant.

MODE FOR CARRYING OUT THE INVENTION

An embodiment of the present invention will be described hereunder on the basis of the drawings.

Figure 1:
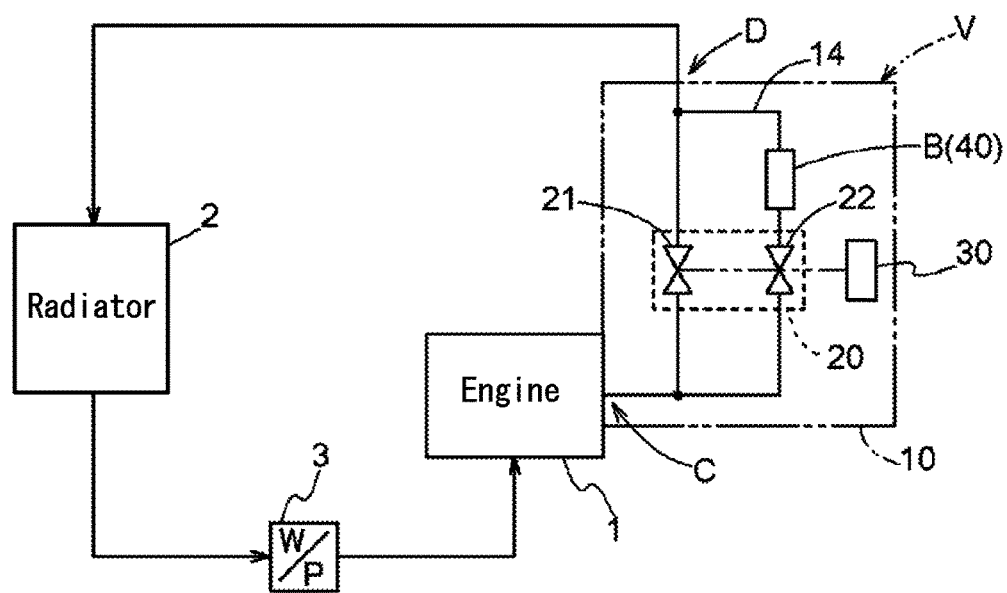
FIG. 1 is a diagram illustrating a configuration of a refrigeration system.
Figure 2:
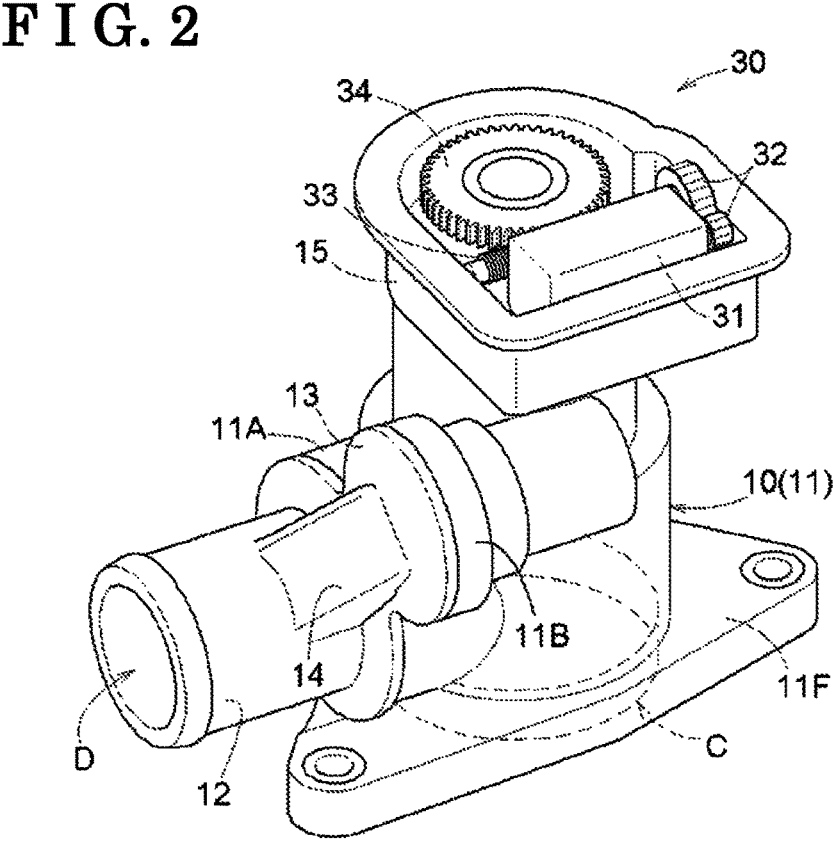
FIG. 2 is a perspective view illustrating an overall configuration of a valve apparatus.

[Basic configuration] As illustrated in FIG. 1, a refrigeration system for an engine is configured to include a valve apparatus V (an example of a refrigerant control valve apparatus) which supplies coolant water (an example of a refrigerant) of an engine 1 serving as an internal combustion engine to a radiator 2, and a water pump 3 (which is abbreviated as W/P in the drawing) which returns the coolant water from the radiator 2 back to the engine 1.

The refrigeration system controls the valve apparatus V on the basis of a measurement result of a water temperature sensor which measures temperature (water temperature) of the coolant water inside the engine 1 and, in accordance with the control, the refrigeration system functions to set a water amount of the coolant water circulating between the engine 1 and the radiator 2. That is, the control is performed such that the supply of the coolant water from the engine 1 to the radiator 2 is stopped in a case where a warming-up is needed, for example, immediately after the engine 1 is started, and such that a flow amount of the coolant water (the refrigerant) is set so as to maintain temperature of the engine 1 appropriately after the warming-up.

[Valve apparatus] As illustrated in FIGS. 2 to 4 and FIG. 8, the valve apparatus V includes a valve housing 10 made of resin, a valve body 20 made of resin which is a rotary type valve body, a posture setting unit 30 which sets a rotation posture of the valve body 20 and a fail-safe mechanism 40 which opens in a case where the temperature of the coolant water exceeds a set value. The valve apparatus V further includes a seal mechanism 50 provided between the valve body 20 and an inner end of a discharge cylinder 12 serving as a discharge port D.

The valve housing 10 includes a housing main body 11 provided with a flange portion 11F, the discharge cylinder 12, a temperature sensing chamber cover 13 closing a temperature sensing chamber B (refer to FIG. 4), a bypass flow path 14 sending the coolant water in the temperature sensing chamber B to the discharge cylinder 12, and a unit accommodation portion 15 accommodating the posture setting unit 30. A cover body of the unit accommodation portion 15 is omitted in the drawings, however, the unit accommodation portion 15 includes a sealing structure when being covered with the cover body.

At the valve apparatus V, a valve chamber A accommodating the valve body 20 is formed inside the housing main body 11 and the temperature sensing chamber B accommodating the fail-safe mechanism 40 is formed at a position that is in communication with the valve chamber A. An inlet port C is formed at a flange surface of the flange portion 11F. With the above-described configuration, by fixedly connecting the flange portion 11F to an outer wall of the engine 1, the coolant water at a water jacket can be supplied directly to the inlet port C. The discharge cylinder 12 functions as the discharge port D, and a radiator hose through which the coolant water is sent to the radiator 2 is connected to the discharge cylinder 12.

The housing main body 11 includes a main cylindrical portion 11A being in communication with the discharge port D and a sub cylindrical portion 11B forming the temperature sensing chamber B, which are made of resin material to be integral with the housing main body 11. The discharge cylinder 12, the temperature sensing chamber cover 13 and the bypass flow path 14 are configured as an integral object. An internal sleeve 12A is formed at a position which continues to the discharge cylinder 12. A connection portion 12B including a flange shape is formed at a boundary position between the discharge cylinder 12 and the internal sleeve 12A.

With the above-described configuration, the internal sleeve 12A of the discharge cylinder 12 is inserted into an inside of the main cylindrical portion 11A, the connection portion 12B is made to be in contact with an outer end portion of the main cylindrical portion 11A, and the contact portion is welded. The temperature sensing chamber cover 13 is arranged at a position at which the sub cylindrical portion 11B is covered or closed, and then the temperature sensing chamber cover 13 is welded. Thus, the discharge cylinder 12 is formed in a protruding manner, and the temperature sensing chamber B and the discharge cylinder 12 are in communication with each other via the bypass flow path 14.

The valve body 20 is formed, as a whole, in a cylindrical shape of which a center is a rotational axis X. A main control valve 21 is formed at the valve body 20 at one side in a direction along the rotational axis X and a temperature sensing control valve 22 is formed at another side. An outer circumference of the main control valve 21 is formed to be a spherical surface 21A, and a main hole portion 21B which allows the spherical surface 21A and an internal space portion of the valve body 20 to be in communication with each other is formed at the main control valve 21. An outer circumference of the temperature sensing control valve 22 is formed as a cylindrical surface 22A. A temperature sensing hole portion 22B allowing the cylindrical surface 22A and the internal space portion of the valve body 20 to be in communication with each other is formed at the temperature sensing control valve 22.

That is, the internal space portion of the valve body 20 is in a state of being in communication with the valve chamber A, and is in a state in which the coolant water from the inlet port C flows into the internal space portion. The main control valve 21 controls supply and discharge of the coolant water relative to the discharge port D. The temperature sensing control valve 22 functions to control supply and discharge of the coolant water relative to the temperature sensing chamber B. The main control valve 21 and the temperature sensing control valve 22 rotate integrally with the valve body 20.

A support portion 23 is integrally formed at an inside of the valve body 20. The support portion 23 includes an opening which enables the coolant water to flow and a connection portion provided at a central position. An intermediate portion of a rotational shaft 24 is connected to the support portion 23. Thus, the rotational shaft 24 is arranged coaxially with the rotational axis X.

A shaft bearing body 25 is provided in a manner that the shaft bearing body 25 is fitted in the inlet port C of the housing main body 11. The shaft bearing body 25 is provided with an opening which enables the coolant water to flow in and a bearing portion formed at a central position.

One end of the rotational shaft 24 is rotatably supported at the bearing portion. A shaft bearing portion 26 is provided at the housing main body 11, at a side opposite to the inlet port C, and the other end of the rotational shaft is rotatably supported at the shaft bearing portion 26.

The posture setting unit 30 is accommodated in the unit accommodation portion 15 which is a sealed space portion. The posture setting unit 30 includes a wheel gear 34, and a drive force of an electric motor 31 is reduced at a reduction gear 32 and then is transmitted to the a worm gear 33, and the wheel gear 34 is driven by the worm gear 33. The wheel gear 34 is connected to an end portion of the rotational shaft 24.

The posture setting unit 30 includes a rotational angle sensor 35 which detects a posture of the valve body 20 from a rotation posture of the wheel gear 34. The rotational angle sensor 35 is a non-contact type sensor which detects a rotation angle from magnetic flux of permanent magnet provided at the wheel gear 34, however, a contact-type including potentiometer may be used, for example.

With the above-described configuration, the electric motor 31 is operated by a drive signal from an outside, and rotates the rotational shaft 24 by feeding back a signal of the rotational angle sensor 35. Thus, an opening degree of the main control valve 21 can be set at a target value.

Figure 4:
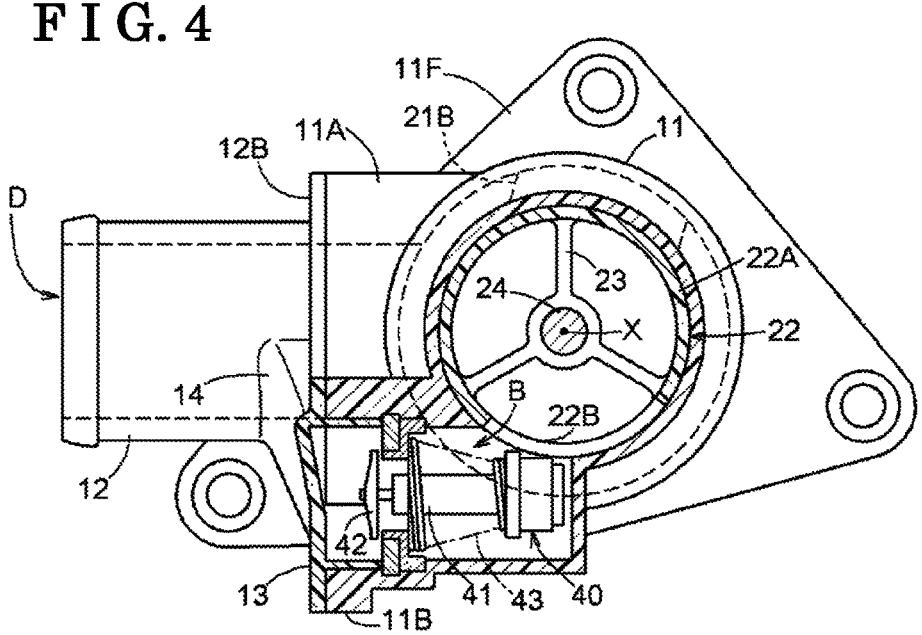
FIG. 4 is a transverse cross-sectional view of the valve apparatus in a state in which the main control valve is in the closed state.
Figure 6:
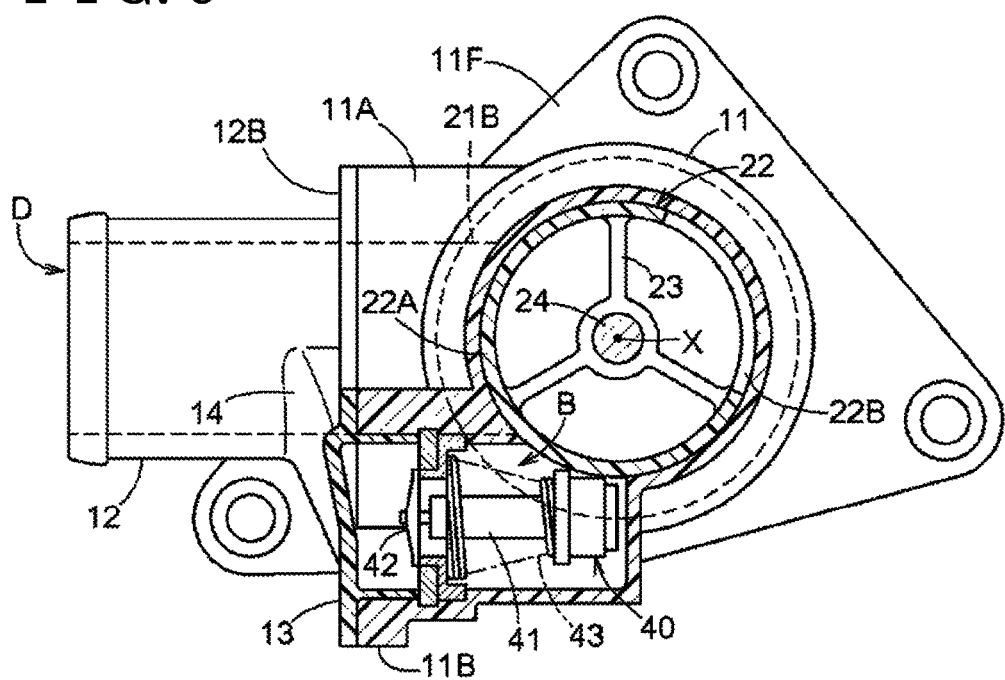
FIG. 6 is a transverse cross-sectional view of the valve apparatus in a state in which the main control valve is in the open state.

[Fail-safe mechanism] As illustrated in FIGS. 4 and 6, the fail-safe mechanism 40 includes a heat sensing member 41, including wax, an on-off valve 42 supported at an end portion of the heat sensing member 41 and a valve spring 43 biasing the on-off valve 42 in a closing direction.

Figure 3:
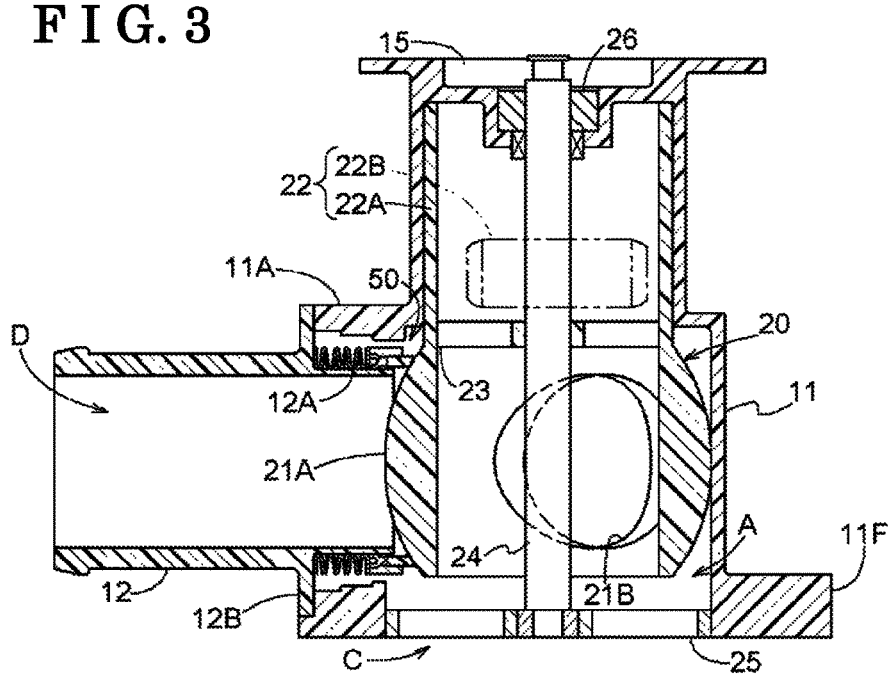
FIG. 3 is a longitudinal cross-sectional view of the valve apparatus in a state in which a main control valve is in a closed state.

According to the valve apparatus V, in a case where the valve body 20 is set in a closed posture illustrated in FIG. 3, the main control valve 21 blocks a flow of the coolant water between the valve chamber A and the discharge cylinder 12 while the temperature sensing control valve 22 allows the valve chamber A and the temperature sensing chamber B to be in communication with each other as illustrated in FIG. 4. Contrary to this, in a case where the valve body 20 is set in an open posture illustrated in FIG. 5, the main control valve 21 allows the valve chamber A and the discharge cylinder 12 to be in communication with each other while the temperature sensing control valve 22 blocks a flow of the coolant water between the valve chamber A and the temperature sensing chamber B as illustrated in FIG. 6.

As described above, the fail-safe mechanism 40 is accommodated in the temperature sensing chamber B. The coolant water is supplied from the valve chamber A to the fail-safe mechanism 40 via the temperature sensing hole portion 22B of the temperature sensing control valve 22 only in a case where the main control valve 21 is in the closed posture. That is, the temperature sensing chamber B is arranged at a position such that the temperature sensing hole portion 22B of the temperature sensing control valve 22 and the temperature sensing chamber B face each other so that the temperature sensing hole portion 22B and the temperature sensing chamber B are in a linearly-connected-positional relationship with each other, in a state where the temperature sensing control valve 22 opens.

As the temperature of the coolant water exceeds the set value, the heat sensing member 41 expands as illustrated in FIG. 4, and thus the on-off valve 42 opens against the biasing force of the valve spring 43. Accordingly, the coolant water from the inlet port C can be sent to the bypass flow path 14 via the valve chamber A and the temperature sensing chamber B, and then can be discharged from the discharge port D. A mode of operation of the fail-safe mechanism 40 will be described later.

Figure 7:
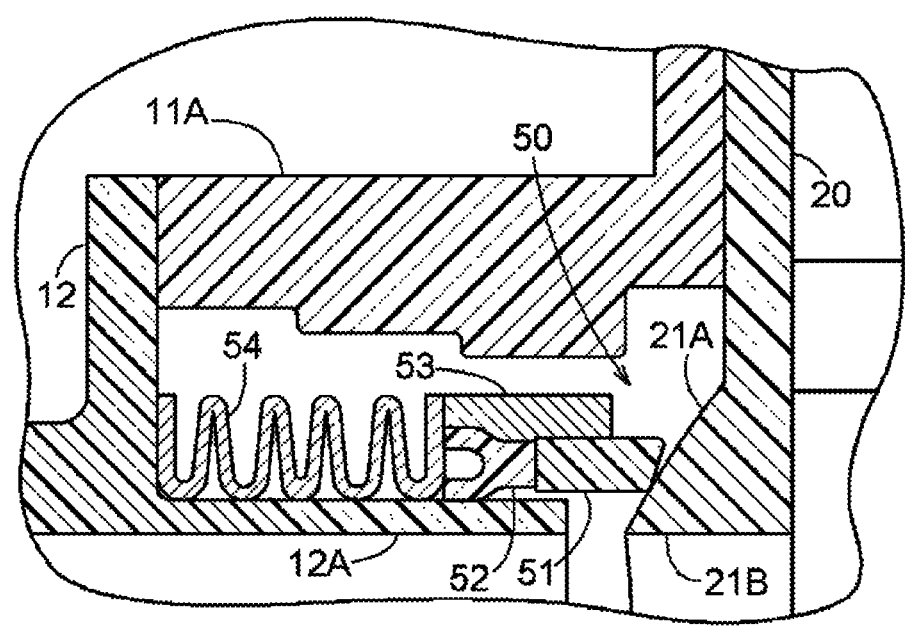
FIG. 7 is a cross-sectional view of a seal mechanism.
Figure 8:
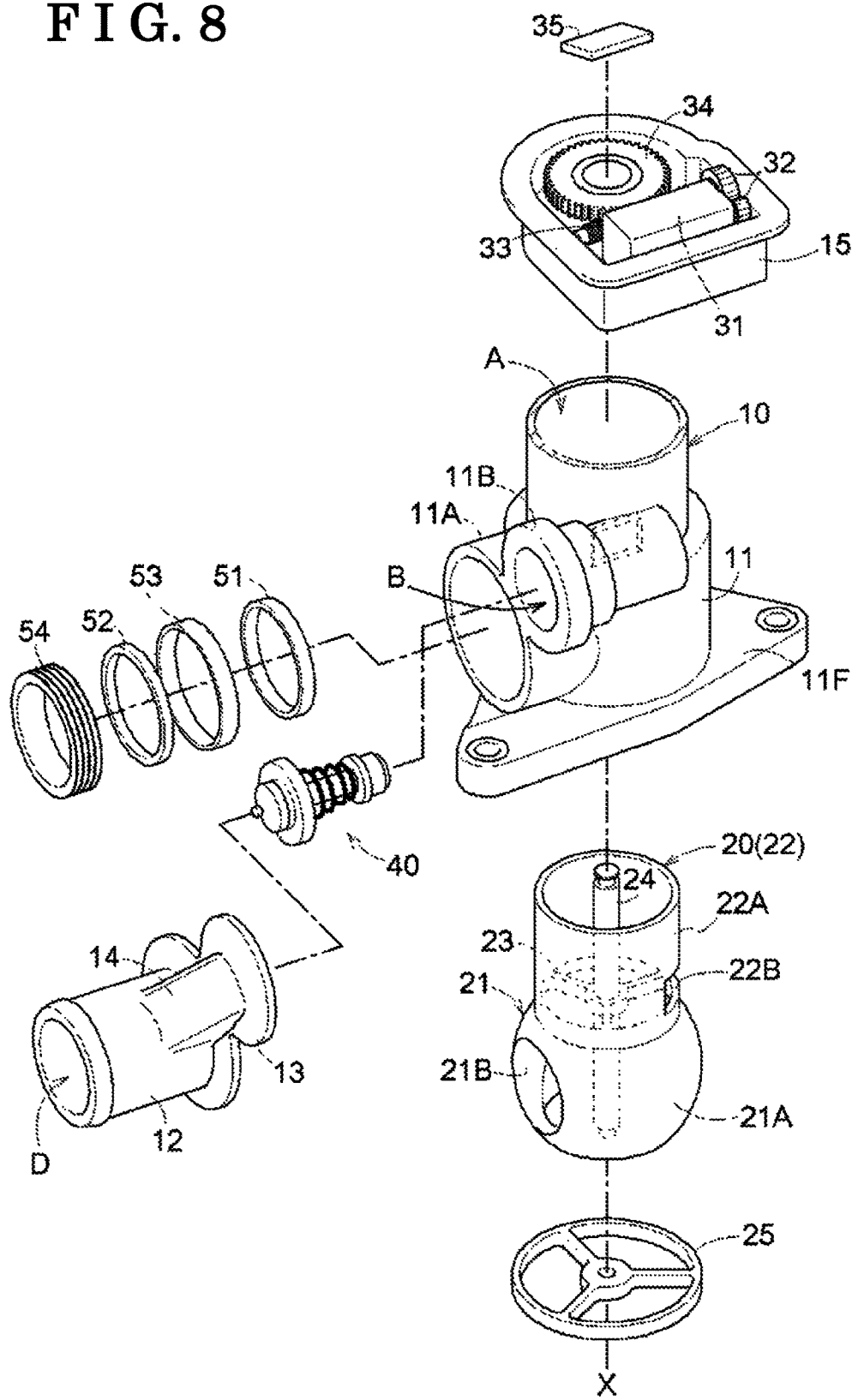
FIG. 8 is an exploded perspective view of the valve apparatus.

[Seal mechanism] As illustrated in FIG. 7, the seal mechanism 50 is formed by a seal ring 51, a packing 52, a support ring 53 and a spring 54 and they are arranged at an outer circumference of the internal sleeve 12A of the discharge cylinder 12, the internal sleeve 12A which is arranged inside the main cylindrical portion 11A.

The seal ring 51 is formed by resin material of which an inner diameter is formed to be slightly larger than a hole diameter of the main hole portion 21B. The seal ring 51 actually provides a sealing performance by being in contact with the spherical surface 21A of the main control valve 21. The packing 52 is made of resin and formed in a ring shape including a lip portion which is in contact with an outer surface of the internal sleeve 12A. The packing 52 maintains water-tightness relative to the outer circumference of the internal sleeve 12A. The support ring 53 is formed by metal material including, for example, stainless, which makes the biasing force of the spring 54 to act on the seal ring 51. The spring 54 provides the biasing force to the seal ring 51 via the support ring 53.

At the valve apparatus V, because a gap is provided between an inner wall surface of the housing main body 11 and an outer circumference of the spherical surface 21A of the main control valve 21, a space portion in which the seal mechanism 50 is arranged is filled with the coolant water, and pressure which is equal to pressure in the inlet port C works relative to the space portion.

In the seal mechanism 50, a mobile member (the seal ring 51, the packing 52 and the support ring 53) moving integrally with one another in a direction in which the biasing force of the spring 54 works is arranged at a position surrounded by the coolant water, and accordingly pressure working from the coolant water relative to the mobile member from a direction of the valve body 20 is equal to pressure working from a direction of an outer wall of the valve housing 10. Due to this configuration, the respective pressures cancelled out or are balanced out with each other, and thus only the biasing force of the spring 54 acts on the seal ring 51. Accordingly, only the pressure that is required for the sealing works, thereby achieving a satisfactory sealing performance.

[Control mode of the valve apparatus] At the valve apparatus V, in a case where the valve body 20 is set in the closed posture as illustrated in FIGS. 3 and 4, the main control valve 21 blocks the flow of the coolant water between the valve chamber A and the discharge cylinder 12, and the temperature sensing control valve 22 makes the valve chamber A and the temperature sensing chamber B to be in communication with each other to allow the coolant water to flow therebetween.

According to the valve apparatus V including the above-described configuration, the closed posture, in which the main hole portion 21B of the main control valve 21 cannot supply the coolant water to the discharge cylinder 12, is established. According to the valve apparatus V of the present embodiment, however, even in the closed posture in which the coolant water is not supplied to the discharge cylinder 12, the coolant water needs to be supplied to the fail-safe mechanism 40. Consequently, at the valve apparatus V of the present embodiment, in a case where the valve body 20 is in the closed posture, such a posture is set that the main control valve 21 is in a closed state and the temperature sensing hole portion 22B of the temperature sensing control valve 22 is fully open as illustrated in FIGS. 3 and 4.

Figure 5:
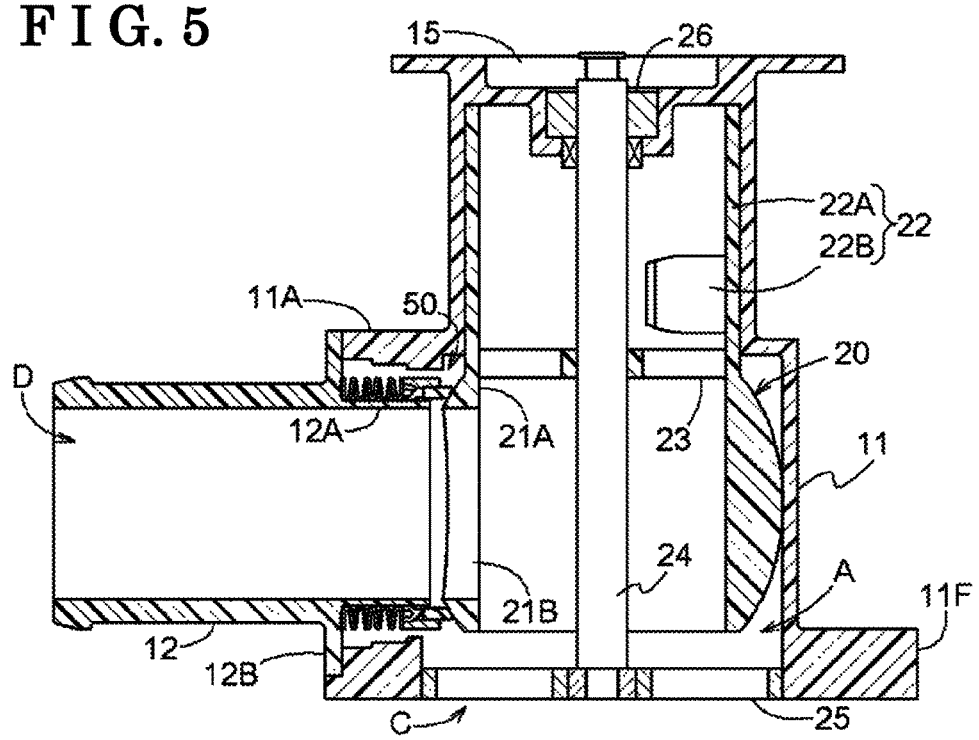
FIG. 5 is a longitudinal cross-sectional view of the valve apparatus in a state in which the main control valve is in an open state.

In a case where the valve body 20 is set to be in the open posture as illustrated in FIGS. 5 and 6, the main control valve 21 makes the valve chamber A and the discharge cylinder 12 to be in communication with each other, and the temperature sensing control valve 22 blocks the flow of the coolant water between the valve chamber A and the temperature sensing chamber B. The open posture is not limited to a fully-open state but includes a posture which allows the coolant water to flow from a part of the main hole portion 21B. As described above, even in a case where the main control valve 21 is in a posture which has not reached the fully-open state, the temperature sensing control valve 22 is maintained in the closed posture.

Consequently, at the warming-up of the engine 1, the posture setting unit 30 sets the valve body 20 at the closed posture. As a result, the coolant water which has flowed from the inlet port C into the valve chamber A is blocked from being supplied to the radiator 2, and the coolant water of the valve chamber A can flow into the temperature sensing chamber B.

In particular, in a case where the temperature of the coolant water exceeds the set value under the circumstances where, for example, the posture setting unit 30 has a failure and thus the main control valve 21 remains fixed in the closed posture, the on-off valve 42 opens due to the expansion of the heat sensing member 41 (refer to FIG. 4). As being opened in the aforementioned way, the coolant water of the engine 1 can be sent from the valve chamber A to the temperature sensing chamber B, and moreover the coolant water from the temperature sensing chamber B can be supplied from the bypass flow path 14 to the discharge cylinder 12, thereby preventing or reducing overheat of the engine 1.

After the warming-up operation is finished, the posture setting unit 30 rotates the valve body 20 and thereby setting the main control valve 21 in the open posture. Specifically, the opening degree of the main control valve 21 is set low in a case where the temperature of the coolant water is low, and the opening degree is set larger as the temperature increases. Thus, the coolant water that has flowed into the valve chamber A from the inlet port C is supplied to the radiator 2 from the discharge cylinder 12.

In the open posture, the temperature sensing control valve 22 blocks the flow of the coolant water between the valve chamber A and the temperature sensing chamber B, from a state in which the main control valve 21 is slightly open to a state in which the main control valve 21 comes to the fully-opening. Accordingly, even if the temperature of the coolant water increases, a phenomenon in which the fail-safe mechanism 40 is open can be prevented. Further, even in a case where the temperature of the coolant water temporarily increases, and the heat sensing member 41 is expanded by the temperature increment and thus the on-off valve 42 opens, the coolant water does not flow from the valve chamber A to the temperature sending chamber B. Accordingly, a heat management of the engine 1 can be conducted appropriately without increasing an amount of the coolant water supplied to the radiator 2.

Other Embodiment

In addition to the aforementioned embodiment, the following configuration may be applicable. As the basic configuration is the same as the aforementioned embodiment, only a difference in the configuration will be explained using the drawings. For facilitating understanding of the drawings, the same names and numerical designations as the aforementioned embodiment are used in the explanation.

Figure 9:
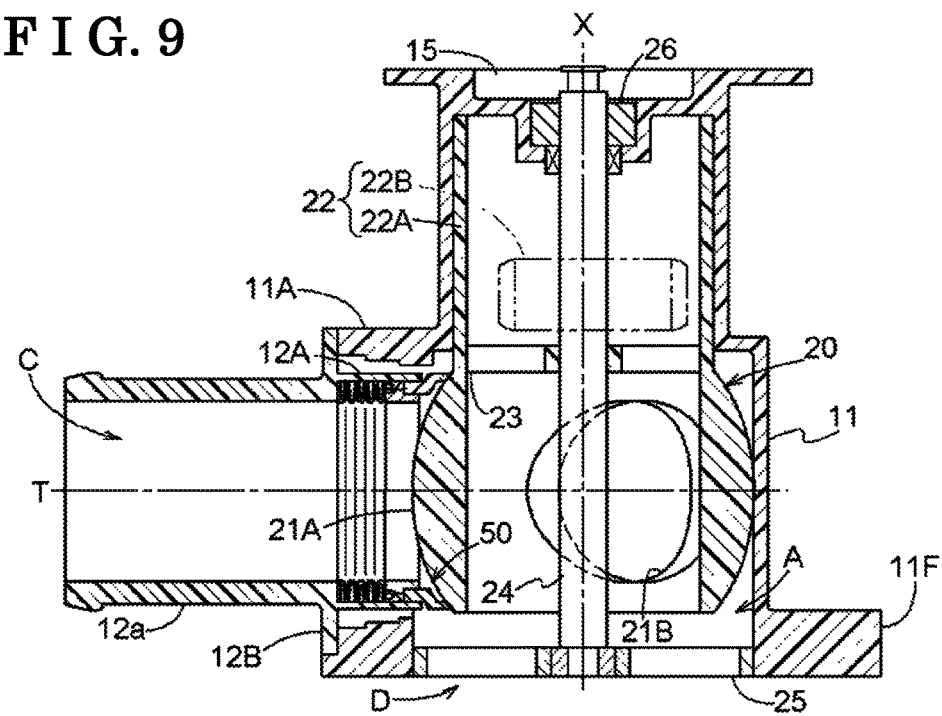
FIG. 9 is a longitudinal cross-sectional view of a valve apparatus of another embodiment.
Figure 10:
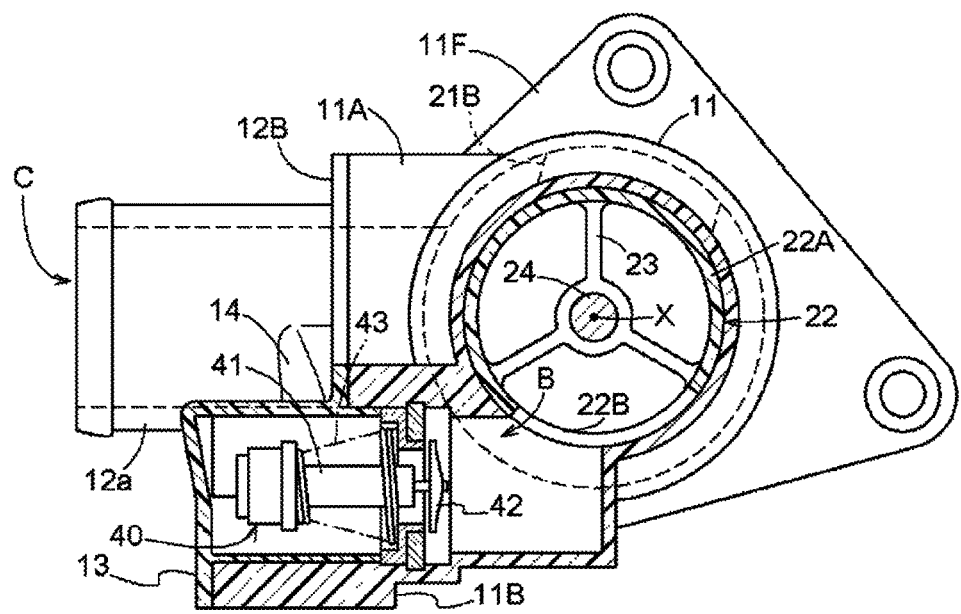
FIG. 10 is a cross-sectional view of the valve apparatus of the embodiment.
Figure 11:
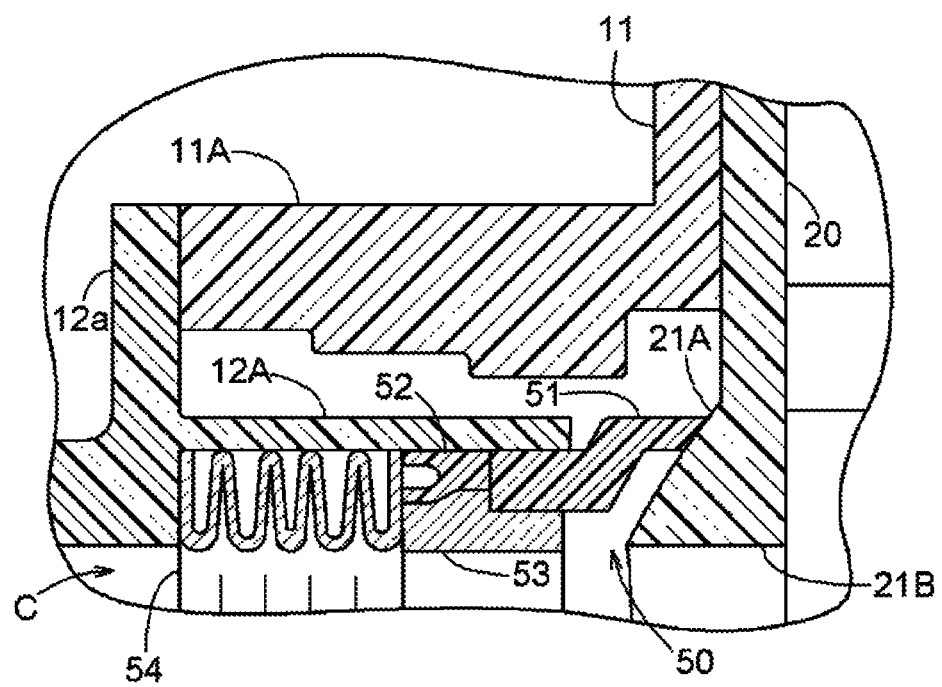
FIG. 11 is a cross-sectional view of a seal mechanism of the embodiment.

(a) In FIGS. 9 to 11, an embodiment is illustrated in which the respective positions of the inlet port C and the discharge port D are inverted with respect to each other, relative to the aforementioned embodiment. In this case, for example, by connecting the flange portion 11F formed at the discharge port D to the outer wall of the engine 1, the valve apparatus V is arranged such that the coolant water from the engine 1 is made to flow into the inlet port C via the radiator 2 and the coolant water is sent from the discharge port D to the water jacket.

As illustrated in FIG. 9, the main cylindrical portion 11A that is in communication with the inlet port C is formed at the housing main body 11 and the seal mechanism 50 is provided between the valve body 20 and an inner end of an inlet cylinder 12a serving as the inlet port C. The internal space portion of the valve body 20 is in communication with the discharge port D, and the internal space portion is in communication with the inlet port C in a case where the valve body 20 is set in the open posture.

As illustrated in FIG. 11, the seal mechanism 50 is formed by the seal ring 51, the packing 52, the support ring 53 and the spring 54, and they are arranged at an inner circumference of the internal sleeve 12A of the inlet cylinder 12a, the internal sleeve 12A which is arranged inside the main cylindrical portion 11A. The packing 52 includes a lip portion being in contact with an inner surface of the internal sleeve 12A and maintains the water-tightness relative to the inner circumference of the internal sleeve 12A.

In the present embodiment, a space portion at the inner circumference of the internal sleeve 12A corresponds to the seal accommodation portion, and accordingly the mobile body (the seal ring 51, the packing 52 and the support ring 53) is surrounded by the coolant water from the inlet port C. As a result, the pressures acting on both surfaces of the mobile member are equal to each other and the respective pressures are cancelled out each other. Thus, only the biasing force of the spring 54 acts on the seal ring 51, thereby achieving the satisfactory sealing performance.

As illustrated in FIG. 10, the temperature sensing chamber B is in communication with the inlet port C via the bypass flow path 14, and the coolant water from the inlet port C is supplied to the fail-safe mechanism 40. Accordingly, when the temperature of the coolant water exceeds the set value, the heat sensing member 41 expands and the on-off valve 42 is opened against the biasing force of the valve spring 43. When the posture which allows the temperature sensing hole portion 22B of the temperature sensing control valve 22 to be fully open is set, the coolant water from the inlet port C is sent to the valve chamber A via the bypass flow path 14 and the temperature sensing chamber B, and then is discharged from the discharge port D.

As a consequence, even in a case where the temperature of the coolant water exceeds the set value under the circumstances where, for example, the posture setting unit 30 has a failure and thus the main control valve 21 remains fixed in the closed posture, the engine 1 is prevented from being overheated because the temperature sensing hole portion 22B is in the open state. On the other hand, the temperature sensing control valve 22 blocks the flow of the coolant water between the valve chamber A and the temperature sensing chamber B from the state in which the main control valve 21 is slightly open to the state in which the main control valve 21 comes to the fully-opening. Accordingly, even if the temperature of the coolant water increases, the phenomenon in which the fail-safe mechanism 40 is open can be prevented.

(b) A port for supplying the coolant water of the valve chamber A to, for example, an EGR cooler and/or a heater core, depending on the setting of the posture of the valve body 20 may be provided at the valve housing 10. According to this, by setting the posture of one valve body 20, the supply and discharge of the coolant water is allowed relative to apparatuses mounted on a vehicle.

(c) In the aforementioned embodiment, a seal or the like is not provided at a portion of the temperature sensing control valve 22, however, a seal including a similar configuration to the seal mechanism 50 of the main control valve 21 may be provided. Instead of using a coil spring like the seal mechanism 50, a simple seal including an O-ring may be provided to be fitted to an exterior of the cylindrical surface 22A of the temperature sensing control valve 22.

INDUSTRIAL APPLICABILITY

The present invention can be used for a refrigerant control valve apparatus which supplies and discharges a refrigerant of an internal combustion engine to a radiator.

EXPLANATION OF REFERENCE NUMERALS 1 internal combustion engine (engine)
10 valve housing
14 bypass flow path
20 valve body
21 main control valve
22 temperature sensing control valve
40 fail-safe mechanism
41 heat sensing member
42 on-off valve
B temperature sensing chamber
C inlet port
D discharge port
X rotational axis

The invention claimed is:

1. A refrigerant control valve apparatus comprising:
a valve housing provided with an inlet port to which refrigerant from an internal combustion engine is supplied and a discharge port from which the refrigerant is sent out;
a valve body provided at an inside of the valve housing to be rotatable about a rotational axis, the valve body corresponding to a rotary-type; and
a fail-safe mechanism configured to send out the refrigerant to the discharge port via a bypass flow path in a case where temperature of the refrigerant from the internal combustion engine exceeds a set value, wherein
the valve body is configured to include a main control valve controlling supply and discharge of the refrigerant to the discharge port and a temperature sensing control valve controlling supply and discharge of the refrigerant to a temperature sensing chamber in which the fail-safe mechanism is accommodated, in such a manner that the main control valve and the temperature sensing control valve rotate integrally with each other,
the valve body sets the temperature sensing control valve in an open posture in a case where the main control valve is in a closed posture that closes the discharge port, and
the valve body sets the temperature sensing control valve in a closed posture in a case where the main control valve is in an open posture that opens the discharge port.

2. The refrigerant control valve apparatus according to claim 1, wherein the fail-safe mechanism is configured as a thermostat type including a heat sensing member, the heat sensing member closes the bypass flow path with an on-off valve in a case where the temperature of the refrigerant is less than a set value and opens the bypass flow path with the on-off valve due to thermal expansion in a case where the temperature of the refrigerant exceeds a set value.

3. The refrigerant control valve apparatus according to claim 1, wherein the temperature sensing control valve opens at a position which faces the temperature sensing chamber in a case where the main control valve is in the closed posture.

* * * * *